US012601935B2

(12) United States Patent
Lim et al.

(10) Patent No.: US 12,601,935 B2
(45) Date of Patent: Apr. 14, 2026

(54) DEVICE AND PROCESS FOR ALERTING FOR EYE EXAM OR CHANGE OF FRAME OR LENS

(71) Applicant: Essilor International, Charenton-le-Pont (FR)

(72) Inventors: Ee Woon Lim, Singapore (SG); Adeline Yang, Singapore (SG)

(73) Assignee: Essilor International, Charenton-le-Pont (FR)

( * ) Notice: Subject to any disclaimer, the term of this patent is extended or adjusted under 35 U.S.C. 154(b) by 718 days.

(21) Appl. No.: 17/906,916

(22) PCT Filed: Mar. 25, 2021

(86) PCT No.: PCT/EP2021/057811
§ 371 (c)(1),
(2) Date: Sep. 21, 2022

(87) PCT Pub. No.: WO2021/191382
PCT Pub. Date: Sep. 30, 2021

(65) Prior Publication Data
US 2023/0136104 A1 May 4, 2023

(30) Foreign Application Priority Data
Mar. 27, 2020 (EP) ..................................... 20305354

(51) Int. Cl.
*G02C 11/00* (2006.01)
(52) U.S. Cl.
CPC .................................... *G02C 11/00* (2013.01)

(58) Field of Classification Search
CPC . G02C 11/00; G02C 11/10; A61B 2562/0247; A61B 5/01; A61B 5/6803; A61B 5/746
See application file for complete search history.

(56) References Cited

U.S. PATENT DOCUMENTS 3,542,519 A 11/1970 Montalto et al.
7,232,253 B2 * 6/2007 Isbitsky .................... G04F 1/06
374/102

(Continued)

FOREIGN PATENT DOCUMENTS

EP 2 703 877 A1 3/2014
EP 3316021 A1 * 5/2018

(Continued)

OTHER PUBLICATIONS

Machine translation of KR-2018096405-A (Year: 2018).*

(Continued)

*Primary Examiner* — Matthew Y Lee
(74) *Attorney, Agent, or Firm* — Oblon, McClelland, Maier & Neustadt, L.L.P.

(57) ABSTRACT

The present invention relates to an eyewear device comprising a system for alerting of a need of an eye examination and/or a change of frame and/or a change of lens of the eyewear device, in order to provide the best visual correction and comfort. The invention also relates to a process for monitoring the need of an eye examination and/or a change of frame and/or lens of an eyewear device, comprising using an eyewear device according to the invention, and to a process for manufacturing an eyewear device according to the invention.

14 Claims, 1 Drawing Sheet

(56)            References Cited

U.S. PATENT DOCUMENTS

Figures 1, 2, 3:
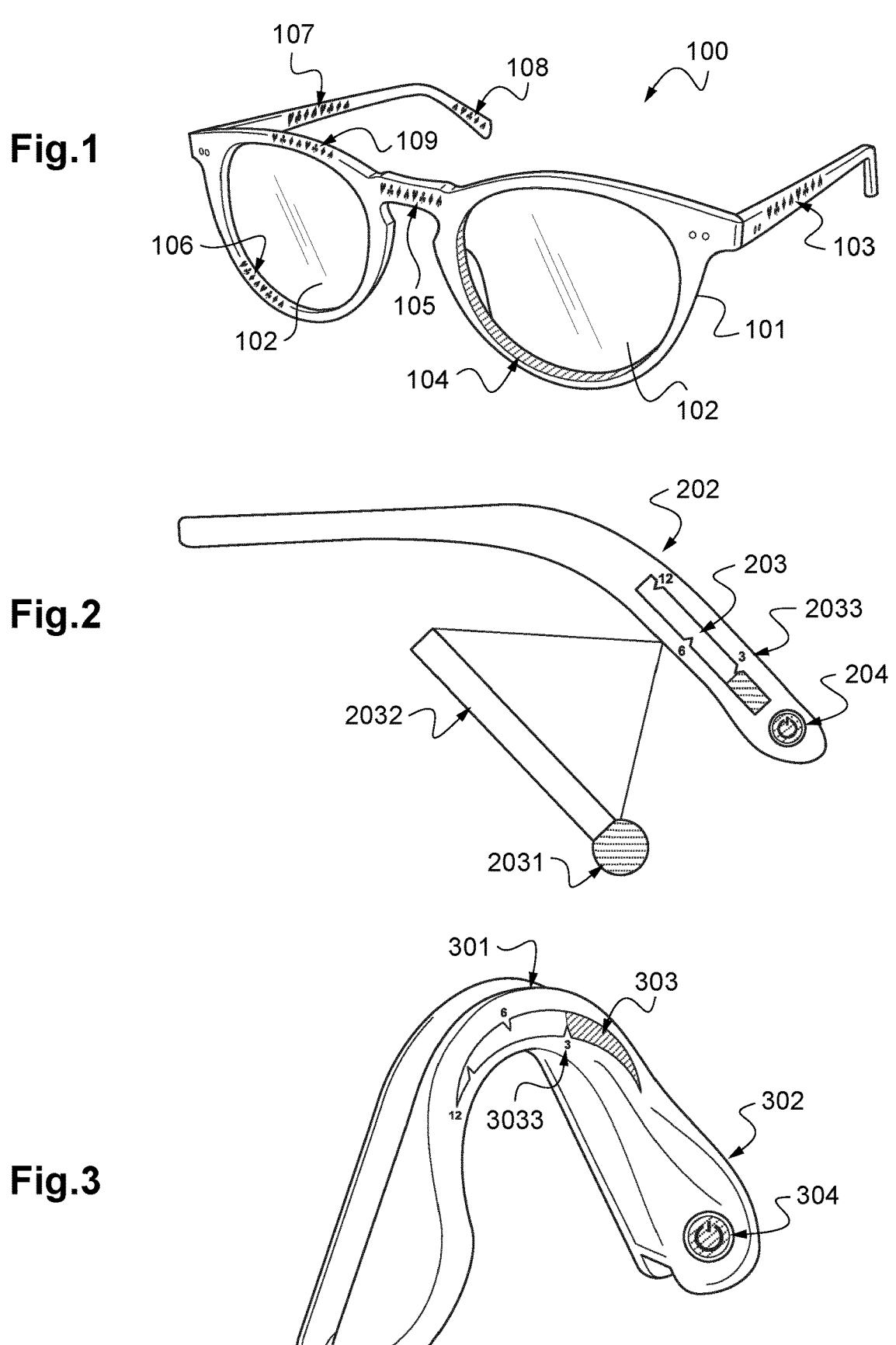

| | | |
|---|---|---|
| 2007/0064541 A1 | 3/2007 | Kagan |
| 2008/0129960 A1* | 6/2008 | Heacock ................ G02C 7/049 |
| | | 351/159.31 |
| 2009/0303440 A1 | 12/2009 | Heacock et al. |
| 2012/0137958 A1 | 6/2012 | Mills et al. |
| 2013/0088683 A1 | 4/2013 | Heacock et al. |
| 2013/0192513 A1 | 8/2013 | Heacock et al. |
| 2014/0055740 A1 | 2/2014 | Spaulding et al. |
| 2014/0350373 A1* | 11/2014 | Pugh ........................ G02C 7/04 |
| | | 600/549 |
| 2015/0377657 A1 | 12/2015 | Heacock et al. |
| 2019/0045782 A1* | 2/2019 | Edye ...................... G02C 13/00 |

FOREIGN PATENT DOCUMENTS

| | | | | |
|---|---|---|---|---|
| GB | 2538715 A | 11/2016 | | |
| KR | 2018096405 A | * 8/2018 | .......... | G02C 13/001 |
| WO | WO-2007013105 A1 | * 2/2007 | .............. | A61B 5/01 |
| WO | WO 2008/067143 A2 | 6/2008 | | |

OTHER PUBLICATIONS

Machine translation of EP-3316021-A1 (Year: 2018).*
International Search Report issued May 3, 2021, in PCT/EP2021/ 057811 filed Mar. 25, 2021, 3 pages.

* cited by examiner

DEVICE AND PROCESS FOR ALERTING FOR EYE EXAM OR CHANGE OF FRAME OR LENS

TECHNICAL FIELD OF THE INVENTION

The invention relates to the area of eyewear devices. More precisely, the invention relates to an eyewear device and a process allowing monitoring a need of an eye examination, a change of frame and/or a change of lens of the eyewear device.

BACKGROUND INFORMATION AND PRIOR ART

Numerous documents describe devices comprising indicators which change after a predetermined period of time. Such indicators usually progressively change color, surface, volume or shape with time.

For instance, dyes which color changes have been used in the food industry to indicate the quality of food that is safe for consumption. The change of color after a predetermined period of time is called chronochromism, and has also been used in personal care devices.

U.S. Pat. No. 3,542,519 discloses a toothbrush comprising a composition which changes color, volume or appearance with the passage of a predetermined time period of toothbrush usage, so that upon expiration of the period a suitable indication is given the user to discard the toothbrush and use a new one.

US 2008/0129960 discloses a disposable device, such as a disposable contact lens, which changes color after being exposed to oxygen for a predetermined period of time indicating that the device should no longer be used. For instance, the disposable contact lens comprises a dye which changes to a visible color after the contact lens has been exposed to oxygen for a predetermined period of time indicating that the contact lens should no longer be used.

Different technologies can be used to generate chronochromism. US 2007/0064541 and U.S. Pat. No. 7,232,253 disclose examples of elapsed time indicator devices.

Wearing corrective glasses, especially in children, requires a strict and regular monitoring of the suitability of the corrective glasses to the wearer's needs. Said monitoring requires first regular eye examinations. Said eye examinations should be performed for instance every 3 months, 6 months or 12 months depending on the type of required correction (myopia, presbyopia, etc.), its rate of progression, and/or the wearer's age. In addition, morphological changes and their impact on the suitability of previously prescribed corrective glasses should also be monitored, especially for children with myopia correction.

Due to increase in prevalence of myopia in children, timely eye examination is important to reduce the progression of myopia. In addition, children develop rapidly in terms of head size and pupillary distance which will affect the fit of eyeglasses and accuracy of refractive correction. In adults, monitoring of myopes and presbyopes for near reading addition needs to be updated regularly and eye examination is also required to detect vision limiting diseases for early intervention.

Chronochromism or any other mechanism triggering color change of a device upon a stimulus or after a time elapse has never been disclosed for its use on an eyewear device so as to alert about a need to perform an eye examination and/or to change of frame or lens.

An eyewear device, at least part of which is able to change color, has already been disclosed for aesthetics and/or easy detection in the dark problematics. Nevertheless, the color change of such devices is not appropriate for alerting about a need to perform an eye examination and/or to change of frame or lens.

SUMMARY OF THE INVENTION

Therefore, one object of the invention is to provide an eyewear device comprising a system for alerting of a need of an eye examination and/or a change of frame and/or a change of lens of the eyewear device, in order to provide the best visual correction and comfort. This is especially important for children to reduce the progression of myopia and allow the developmental growth of their head and face. For adults, this alert will encourage timely eye examination that can help them to have the best visual correction for near and far to ensure their efficiency at work, safety and improve quality of life. Moreover, early detection of eye pathologies can have good prognosis, preventing visual impairment.

The above object is achieved according to the invention by providing an eyewear device comprising a frame and at least one lens, wherein the device comprises at least one frame area and/or lens area which is suitable for changing, wherein color change of the at least frame area and/or lens area is indicative of a need of an eye examination and/or a change of frame and/or a change of lens of the eyewear device.

A first object of the invention is thus an eyewear device comprising a frame and at least one lens,
wherein the device comprises at least one indicator which is able to change,
wherein the at least one indicator change is induced by at least one stimulus, and
wherein the at least one indicator change is indicative of a need of an eye examination and/or a change of frame and/or a change of lens of the eyewear device.
Preferred embodiments of the invention refer to an eyewear device with the following features, taken either alone of in combination with any other feature when they are not mutually exclusive:
the at least one indicator is able to change color, said at least one stimulus induces a color change which is indicative of said need;
at least one indicator is able to change its area, said at least one stimulus induces an area change which is indicative of said need;
the at least one stimulus is selected from the group consisting of a predetermined time elapse, an exposition to a predetermined light, an exposition to a predetermined temperature, an exposition to a predetermined chemical, an exposition to a predetermined mechanical constraint, an exposition to a predetermined bacterial contamination, and an exposition to a predetermined electrical potential;
the at least one indicator is not visible when the eyewear is worn by an individual;
the at least one indicator is positioned on an eyewear area selected from the group consisting of a lens area, a nose bridge, an ear hook, a nose pad and a temple leg;
the eyewear device comprises at least two indicators which are able to change independently of each other;
the stimulus inducing the change of each indicator is different from the stimulus inducing the change of any other indicator;

at least one stimulus is an exposition to a predetermined mechanical constraint and the corresponding change is indicative of a need of a change of frame;

at least one stimulus is a predetermined time elapse and the corresponding change is indicative of a need of an eye examination;

the time elapse indicator comprises a reservoir, a migration medium and an actuator;

the indicator is in the shape of a drawing or text which is not apparent in absence of stimulus, and which appearance is induced by the stimulus;

the indicator comprises at least one medium able to change color selected from the group consisting of a sticker, a chromic paint and a gel;

at least one stimulus is an exposition to a predetermined light, wherein the predetermined light is UV light, and the corresponding at least one indicator comprises at least one dye and/or pigment, and at least one UV-activated releasing agent.

A further object of the invention is a process for monitoring the need of an eye examination and/or a change of frame and/or lens of an eyewear device, comprising using an eyewear device comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device.

Preferred embodiments of the invention refer to a process for monitoring with the following features, taken either alone of in combination with any other feature when they are not mutually exclusive:

the at least one indicator is able to change color, said at least one stimulus induces a color change which is indicative of said need;

at least one indicator is able to change its area, said at least one stimulus induces an area change which is indicative of said need.

A last object of the invention is a process for manufacturing an eyewear device comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device, comprising the steps of:

a) providing at least one indicator which is able to change, b) determining at least one parameter value which, upon reach (stimulus), should trigger a change of the at least one indicator, and c) positioning the at least one indicator on at least one frame or lens area of an eyewear device.

Preferred embodiments of the invention refer to the process for manufacturing an eyewear device with the following features, taken either alone of in combination with any other feature when they are not mutually exclusive:

the at least one indicator is able to change color, said at least one stimulus induces a color change which is indicative of said need;

at least one indicator is able to change its area, said at least one stimulus induces an area change which is indicative of said need.

In a preferred embodiment of the process for manufacturing an eyewear device according to the invention, the at least one stimulus is selected from the group consisting of a predetermined time elapse, an exposition to a predetermined light, an exposition to a predetermined temperature, an exposition to a predetermined chemical, an exposition to a predetermined mechanical constraint, an exposition to a predetermined bacterial contamination, and an exposition to a predetermined electrical potential.

The different embodiments disclosed above regarding the eyewear device can evidently also apply to the process for monitoring the need of an eye examination and/or a change of frame and/or lens of an eyewear device and/or to the process for manufacturing an eyewear device according to the invention.

DETAILED DESCRIPTION OF EXAMPLE(S)

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings:

FIG. 1 discloses an eyewear device according to the invention.

FIG. 2 discloses an example of an indicator according to the invention positioned on an ear hook of the eyewear device.

FIG. 3 discloses another example of an indicator according to the invention positioned on a nose bridge of the eyewear device.

DEVICE

The eyewear device 100 presented on FIG. 1 comprises a frame 101 and two lenses 102. The eyewear device of FIG. 1 comprises different indicators which are able to change 103, 104, 105, 106, 107, 108 and 109. In the present application, the term "able to change" is used to refer to a change in a physical property of the indicator, for instance, it may refer to a change in color, area, volume or shape.

An "eyewear device" according to the invention may be any eyewear device comprising one frame and at least one lens. Preferably, the eyewear device is a corrective eyewear for myopia, astigmatism, hyperopia, presbyopia and/or any other vision defect. The eyewear device may be sunglasses. The eyewear device of the invention may be worn by any individual, for instance by adults or children. In a preferred embodiment, the eyewear device of the invention is to be worn by a child, preferably a child with myopia for whom regular eye examination and/or change of frame or lens are necessary to reduce the progression of myopia and/or allow the developmental growth of their head and face. In another preferred embodiment, the eyewear device of the invention is to be worn by an adult, preferably an adult with myopia and/or presbyopia, or an adult who is likely to develop myopia and/or presbyopia.

Here, the indicator may more specifically be able to change its color and/or to change its area.

The area change of each indicator may be an increase or a decrease of the total surface area of the indicator. The total surface area is for example measured in square millimeters.

The area change may also be a change of the shape of the indicator, with or without changing the total surface area of the indicator. The area change may be a progressive change, for instance as an increasing area of the indicator changing, while the stimulus is being reached. In some embodiment, the area change is the spreading of a liquid, for instance of a given color, in a medium by capillarity. Conversely, the area change may be a decrease of the total surface area of the indicator due to the drying of a liquid.

The area change may be independent of any color change of the indicator. The area change may also be coupled to a brightness or intensity change of the indicator, for example due to the spreading of the liquid.

The color change of each indicator may be a change of the wavelength of the light reflected by a least part of the indicator area. More precisely, it may correspond to a change in at least one of a hue, a saturation, a brightness and an intensity of the color of the indicator. For instance, the color change may be a progressive change from dark grey to white through different shades of grey.

The color change may be a switch between two different colors, or two different hues, saturations, brightnesses or intensities when the stimulus arises, but it may also be a progressive color change as long as stimulus is being reached. The progressive color change may appear for instance as an increasing area of the indicator changing color while the stimulus is being reached, or as a succession of continuous or discrete color changes of the same indicator area while the stimulus is being reached. For instance, upon model of traffic lights, an indicator area may be green when the stimulus is far from being reached, become yellow when the stimulus is getting close, and become red when the stimulus is reached.

The type of color change (switch or progressive) may be selected depending on the stimulus, the monitored need, and/or the individual wearing the eyewear device. A switch color change may be advantageous in that it may be easier to detect and to interpret by the individual wearing the eyewear device. It may also imply a more simple manufacture process. A progressive color change may be advantageous in that it allows scheduling the needed eye examination and/or lens or frame change.

In some embodiments, the indicator comprises at least one lighting element, such as a Light Emitting Diode, and the color change of the indicator corresponds to the lighting on or off of the at least one lighting element. In an embodiment, the lighting element is lighted and, when the stimulus arises, for instance when predefined time has elapsed, the lighting element lights off. Off lighting may be triggered for instance by the lighting element battery dying off or by the circuit getting resistant to current, for instance by oxidation. In another embodiment, the lighting element is lighted off and, when the stimulus arises, for instance when predefined time has elapsed, the lighting element turns on.

An eyewear device 100 according to the invention may comprise one or several indicators which are able to change colors. Preferably, the eyewear device 100 may comprise from 1 to 10, more preferably from 1 to 5, such as for instance from 2 to 5, indicators. In particular, the eyewear device 100 may comprise 1, 2, 3, 4, 5, 6, 7, 8, 9 or 10 indicators. When the eyewear device 100 comprises at least two indicators, they preferably change color independently one from another. The color changes of the different indicators are preferably independent in terms of color before and after change, of moment when the color changes, and/or of stimulus inducing the color change.

When at least two indicators which are able to change colors are provided on the same eyewear device, they are preferably each indicative of a different need among a need of an eye examination, a need of a change of frame or a need of a change of lens of the eyewear device. In other embodiments, the color change of a single indicator may be indicative of at least two different needs, or may be induced by at least two different stimuli. Preferably, the shape and/or the color of the indicator after color change is different depending on the reminded need and/or depending on the stimulus inducing the color change.

The several indicators provided on the same eyewear device can present color changes induced by the same or by different stimuli. Preferably, the color change of each indicator is induced by a different stimulus.

Each indicator which is able to change color can be positioned on different places on the eyewear device. The indicators 103 and 107 are positioned on a temple leg, the indicator 108 is situated on an ear hook, the indicators 104 and 106 are positioned between the frame 101 and one lens 102, the indicator 109 is positioned on the top part of the frame and the indicator 105 is positioned on the nose bridge.

The indicators may be positioned so as to be visible when the eyewear device is worn by an individual (103, 104, 105, 106, 109), or so as not to be visible when the eyewear device is worn by an individual (107, 108).

The shape of each indicator can be independently any shape. The indicators 103, 105, 106, 107, 108 and 109 are in the shape of a text which is not apparent in absence of stimulus and which appearance is induced by a stimulus. Alternatively, an indicator of an eyewear device according to the invention may be in the shape of a text or drawing which is apparent in absence of stimulus, and which disappearance is induced by the stimulus. The indicator 104 is in the shape of a color change of an area of the frame 101. The area changing color of the indicator 104 is positioned between the frame 101 and the lens 102. The area changing color may be any position, any color and any size as long as the color change is perceptible by the human eye.

When the shape of the indicator is a text, the message displayed or erased by the color change is preferably directly linked to the need which is reminded and/or to the stimulus inducing the color change. For instance, a message such as "eye exam" may be displayed by the color change of the indicator (103, 105, 106, 108, 109) when a need exists for an eye examination. A message such as "eye exam" may be displayed by the color change of the indicator (103, 105, 106, 108, 109) when the stimulus is a predetermined time elapse. A message such as "too tight" may be displayed by the color change of the indicator (107) when a need exists for a change of frame. A message such as "too tight" may be displayed by the color change of the indicator (107) when the stimulus is a predetermined mechanical constraint.

The color change of the indicator(s) may affect only part of the indicator(s) area, and the area(s) which change(s) color may correspond to regions of interest regarding the need of an examination change and/or of change of a frame or lens. For instance, the area(s) which change(s) color may correspond to the area(s) where the stimulus, such as a predetermined mechanical constraint, has been reached. The area(s) which change(s) color may correspond to pressure points of the eyewear device, and the color change may thus help changing the frame in order to relieve the pressure points.

FIG. 2 presents a part of a temple leg 201 and an ear hook 202 of an eyewear device 100 according to the invention. The indicator 203 comprises a reservoir 2031 and a migration medium 2032 which color progressively changes in response to a stimulus. The stimulus inducing the color change of indicator 203 is time elapse. A graduation 2033 corresponding to time elapse (3, 6, 12 in months) is positioned along the migration medium and indicates how many months have passed since the color change has started. The start of the color change can be triggered at any desired moment, for instance when the eyewear device 100 is being first worn by the individual. The start of the color change can be triggered by actuation of an actuator. The start of the color change of the indicator 203 is triggered by a pressure on the blister 204. Alternatively, the start of the color change of the indicator may be triggered passively without any need of acting on any actuator.

The color change of the indicator may concern part of the indicator or the entire indicator. For instance, the color change of indicator 203 which is induced by time elapse is progressive, as long as time goes an increasing area of the indicator 203 changes color.

In another embodiment, the reservoir 2031 is filed with a fluid which travels the migration medium 2032 due the capillary effect. Here, the fluid does not change color. The graduation 2033 sill corresponds to an elapsed time (for example 3, 6, 12 in months) which indicates how much time has passed since the indicator change started. In this embodiment, the indicator only changes its length, and therefore its area, as the fluid progresses in the migration medium 2032 with time.

The indicator may be formed of any appropriate material or material mixture for changing color when a stimulus is applied.

An example of medium which color change is induced by exposition to a predetermined UV light is a medium comprising at least one dye and/or pigment, and at least one UV-activated releasing agent. Upon exposition to UV light, the UV-activated releasing agent releases the at least one dye and/or pigment, triggering the color change of the indicator medium. The UV-activated releasing agent may be for instance at least one iodonium or sulfonium salt or chloral hydrate. An example of UV indicator is disclosed in US 2012/0137958. Alternatively to UV light, the predetermined light of the stimulus may be a light of a different wavelength, such as blue light or near-infrared light.

An example of medium which color change is induced by time elapse is a migration medium connected to a reservoir containing an ink comprising at least one dye. Upon optional activation, or passively, the ink comprising at least one dye travels slowly along the length of the migration medium with time. At each time point, for instance after 3 months, 6 months or 12 months, the ink comprising at least one dye travels a known distance and the migration medium progressively changes color, for instance depending on the ink density in the medium.

An example of medium which color change is induced by temperature is a thermosensitive medium. The thermosensitive medium may be sensitive to a temperature range from about 37° C. to about 38° C., corresponding to the temperature of the individual's skin, for instance the child's skin.

An example of medium which color change is induced by a chemical reaction is a medium comprising at least one pH indicator. The color change may be induced by cumulative exposure to a pH lower than 5.5, corresponding to the pH of sweat. Examples of pH indicators such as thymol blue or malachite green can be used as they change color as the pH rises over time.

An example of medium which color change is induced by bacterial contamination is a gel medium. Such medium is known in the art and has been used for instance for contact lens cases. In such embodiment, the need which is alerted by the color change may be the need for cleaning and/or for checking the refraction and/or quality of the lens.

FIG. 3 presents a nose hook 301 comprising an indicator 303, along which a graduation 3033 corresponding as time elapse is positioned. The start of the color change of the indicator 303 is triggered by pressure upon an actuator 304, which is positioned on the nose pad 302.

The graduation 2033 or 3033 may be of any shape, for instance indentations in the area changing color, in order for an individual to clearly associate a migration level with a degree of progression of the stimulus.

In an embodiment, the eyewear device according to the invention is a digital and/or smart eyewear device which is associated with a software and/or a mobile phone, and each stimulus further triggers an alert on the software and/or the mobile phone associated with the eyewear device.

Process

The process for monitoring the need of an eye examination and/or a change of frame and/or lens of an eyewear device according to the invention comprises using an eyewear device 100 comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device.

The at least one indicator provided in the process for monitoring may comprise the features disclosed above for indicators of the eyewear device according to the invention. In particular, the at least one indicator provided in the process for monitoring may be able to change color and/or its area.

The monitoring is performed by monitoring the change of at least one indicator of the eyewear device. The type of monitored need can be correlated for instance to the color and/or to the shape of the indicator to be monitored. For instance, the nature of the monitored need can be correlated to the drawing shape and/or to the text of the monitored indicator.

When the eyewear device is a digital and/or smart eyewear device which is associated with a software and/or a mobile phone, the monitoring is further performed by monitoring the occurrence of an alert on the software and/or the mobile phone associated with the eyewear device.

Once a need of an eye examination and/or a change of frame and/or lens of an eyewear device has been determined by the change of at least one indicator of the eyewear device, the individual wearing the eyewear device should visit a professional such as an optometrist or optician. The indicator which color has changed may be replaced by the professional in order to continue monitoring the needs for eye examination and/or change of frame. If the part of the eyewear device where the indicator is positioned does not need being changed, the indicator may be reset by the professional and/or the part of the device wherein the indicator is positioned, for instance a lens area, a nose bridge, an ear hook, a nose pad or a temple leg, may be replaced by the professional.

The change of the indicator means in the present invention that a need exists for an eye examination and/or a change of frame and/or a change of lens of the eyewear device. Nevertheless, one skilled in the art easily understands that other needs which can directly or indirectly be related to the at least one stimulus inducing the color change of the at least one indicator may be similarly concerned and/or monitored while remaining in the scope of the present invention.

The process for manufacturing an eyewear device according to the invention is a process for manufacturing an eyewear device comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device, comprising the steps of:

a) providing at least one indicator which is able to change, b) determining at least one parameter value which, upon reach, should trigger a change of the at least one indicator, and c) positioning the at least one indicator on at least one frame or lens area of an eyewear device.

The at least one indicator provided in step a) may comprise the features disclosed above for indicators of the eyewear device according to the invention. In particular, the at least one indicator provided in the process for manufacturing may be able to change color and/or its area.

The determination of step b) comprises first the determination of which parameter should trigger the color change. Examples of parameters are elapsed time, accumulated light of a predetermined wavelength or in a predetermined wavelength range—also designated as "predetermined light" in the present application, temperature, concentration of a chemical, mechanical constraint, bacterial contamination, predetermined electrical potential, or a combination of at least two thereof. For instance, the parameter may be elapsed time during which the eyewear device has been exposed to a predetermined light, a predetermined temperature, a concentration of a chemical, a predetermined mechanical constraint, a predetermined bacterial contamination or a predetermined electrical potential.

The determination of step b) further comprises the determination of a threshold value or a range of values at which at least part of the indicator changes. The indicator is then designed or selected to provide the desired change.

The positioning of the indicator of step c) may be performed in any position of the eyewear device. For instance, it may be positioned as disclosed above on an eyewear area selected from the group consisting of a lens area, a nose bridge, an ear hook, a nose pad and a temple leg.

Steps (a), (b) and (c) may be performed in any order. The process further comprises classical steps of a process for manufacturing an eyewear device such as positioning at least one lens in the frame. The steps of the process for manufacturing an eyewear device may be performed at different moments. For instance, steps (a), (b) and/or (c) may be performed during the design and/or manufacture of the frame. Conversely, further steps such as lens positioning may be implemented later, when the individual who needs correction buys the frame and the lenses suitable for correcting the individual's vision are positioned in the frame.

The invention claimed is:

1. An eyewear device comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device, wherein at least one stimulus is an exposition to a predetermined mechanical constraint and the corresponding change is indicative of a need of a change of frame.

2. The eyewear device according to claim 1, wherein said at least one indicator is able to change color, wherein said at least one stimulus induces a color change which is indicative of said need.

3. The eyewear device according to claim 1, wherein said at least one indicator is able to change its area, wherein said at least one stimulus induces an area change which is indicative of said need.

4. The eyewear device according to claim 1, wherein the at least one stimulus is selected from the group consisting of a predetermined time elapse, an exposition to a predetermined light, an exposition to a predetermined temperature, an exposition to a predetermined chemical, an exposition to a predetermined mechanical constraint, an exposition to a predetermined bacterial contamination, and an exposition to a predetermined electrical potential.

5. The eyewear device according to claim 1, wherein the at least one indicator is not visible when the eyewear is worn by an individual.

6. The eyewear device according to claim 1, wherein the at least one indicator is positioned on an eyewear area selected from the group consisting of a lens area, a nose bridge, an ear hook, a nose pad and a temple leg.

7. The eyewear device according to claim 1, wherein at least one stimulus is a predetermined time elapse and the corresponding change is indicative of a need of an eye examination.

8. The eyewear device according to claim 7, wherein the time elapse indicator comprises a reservoir, a migration medium and an actuator.

9. The eyewear device according to claim 1, wherein the indicator is in the shape of a drawing or text which is not apparent in absence of stimulus, and which appearance is induced by the stimulus.

10. The eyewear device according to claim 1, wherein the indicator comprises at least one medium able to change color selected from the group consisting of a sticker, a chromic paint and a gel.

11. The eyewear device according to claim 1, wherein at least one stimulus is an exposition to a predetermined light, wherein the predetermined light is UV light, and wherein the corresponding at least one indicator comprises at least one dye and/or pigment, and at least one UV-activated releasing agent.

12. A process for monitoring the need of an eye examination and/or a change of frame and/or lens of an eyewear device, comprising using an eyewear device comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device, wherein at least one stimulus is an exposition to a predetermined mechanical constraint and the corresponding change is indicative of a need of a change of frame.

13. A process for manufacturing an eyewear device comprising a frame and at least one lens, wherein the device comprises at least one indicator which is able to change, wherein the at least one indicator change is induced by at least one stimulus, and wherein the at least one indicator change is indicative of a need of an eye examination and/or a change of frame and/or a change of lens of the eyewear device, comprising the steps of:

a) providing at least one indicator which is able to change, b) determining at least one parameter value which, upon reach, should trigger a change of the at least one indicator, and c) positioning the at least one indicator on at least one frame or lens area of an eyewear device, wherein at least one stimulus is an exposition to a predetermined mechanical constraint and the corresponding change is indicative of a need of a change of frame.

14. The process for manufacturing an eyewear device according to claim 13, wherein the at least one stimulus is selected from the group consisting of a predetermined time elapse, an exposition to a predetermined light, an exposition to a predetermined temperature, an exposition to a predetermined chemical, an exposition to a predetermined mechanical constraint, an exposition to a predetermined bacterial contamination, and an exposition to a predetermined electrical potential.

* * * * *